US012508727B2

(12) United States Patent
Makhal et al.

(10) Patent No.: US 12,508,727 B2
(45) Date of Patent: Dec. 30, 2025

(54) CLOSED LOOP SOLUTION FOR LOADING/UNLOADING CARTONS BY TRUCK UNLOADER

(71) Applicant: INTELLIGRATED HEADQUARTERS, LLC, Mason, OH (US)

(72) Inventors: Abhijit Makhal, Maryland Heights, MO (US); Dikshya Swain, St. Louis, MO (US); Sagar Lakhmani, St. Louis, MO (US); Cory L. Hatina, Weldon Spring, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 441 days.

(21) Appl. No.: 17/448,266

(22) Filed: Sep. 21, 2021

(65) Prior Publication Data
US 2022/0097243 A1 Mar. 31, 2022

Related U.S. Application Data

(60) Provisional application No. 63/083,144, filed on Sep. 25, 2020.

(51) Int. Cl.
*B25J 19/02* (2006.01)
*B25J 18/00* (2006.01)
(Continued)

(52) U.S. Cl.
CPC .............. *B25J 19/023* (2013.01); *B25J 18/00* (2013.01); *B65G 67/24* (2013.01); *G06Q 10/087* (2013.01); *B65G 2203/041* (2013.01)

(58) Field of Classification Search
CPC ........ B25J 19/023; B25J 9/023; B25J 19/021; B25J 18/00; B65G 65/02; B65G 67/24; B65G 2203/041; G06Q 10/087
See application file for complete search history.

(56) References Cited

U.S. PATENT DOCUMENTS

| 5,769,206 A | 6/1998 | Miyazawa et al. |
| 10,035,667 B2 | 7/2018 | Criswell |
| (Continued) | | |

FOREIGN PATENT DOCUMENTS

| CN | 1138551 A | 12/1996 |
| CN | 110072716 A | 7/2019 |
| (Continued) | | |

OTHER PUBLICATIONS

Extended European search report Mailed on Feb. 25, 2022 for EP Application No. 21199009, 14 pages.
(Continued)

*Primary Examiner* — Jason Holloway
*Assistant Examiner* — Christopher A Buksa
(74) *Attorney, Agent, or Firm* — ALSTON & BIRD LLP

(57) ABSTRACT

A truck unloader for unloading cartons from a carton pile includes a controller with a detection system configured to periodically receive one or more images from a vision system and a processor subsystem in connection with the detection system. The processor subsystem configured to calculate a distance from at least a portion of the truck unloader to the carton pile based on the one or more images and advance the truck unloader to perform a sweeping operation based on the distance in an instance in which the distance satisfies a predefined distance threshold. The processor subsystem further configured to monitor a torque input received as a feedback from the one or more sensors while performing the sweeping operation, wherein the
(Continued)

sweeping operation is configured to continue until the torque input exceeds a predefined torque threshold.

13 Claims, 7 Drawing Sheets

(51) Int. Cl.
*B65G 67/24* (2006.01)
*G06Q 10/087* (2023.01)

(56) References Cited

U.S. PATENT DOCUMENTS

| | | | |
|---|---|---|---|
| 10,315,866 | B2 | 6/2019 | Yuvaraj et al. |
| 10,336,562 | B2 | 7/2019 | Girtman et al. |
| 10,662,007 | B2 | 5/2020 | Yuvaraj et al. |
| 2005/0263372 | A1 | 12/2005 | Hollander et al. |
| 2007/0260380 | A1 | 11/2007 | Mintah et al. |
| 2012/0210679 | A1 | 8/2012 | Ford et al. |
| 2014/0341694 | A1 | 11/2014 | Girtman et al. |
| 2017/0341881 | A1 | 11/2017 | Girtman |
| 2018/0022559 | A1 | 1/2018 | Knutson |
| 2018/0072517 | A1 | 3/2018 | Girtman et al. |
| 2018/0174382 | A1 | 6/2018 | Pauli |
| 2020/0151409 | A1* | 5/2020 | Wagner .............. B07C 5/3412 |
| 2021/0378769 | A1* | 12/2021 | Zhou ...................... A61B 34/35 |

FOREIGN PATENT DOCUMENTS

| | | | | |
|---|---|---|---|---|
| CN | 111670681 A | 9/2020 | | |
| WO | 2006/088354 A1 | 8/2006 | | |
| WO | WO-2018182538 A1 * | 10/2018 | ............. | G01S 17/50 |

OTHER PUBLICATIONS

Gualtiero, Fantoni, et al., "Grasping devices and methods in automated production processes", CIRP Annals, Manufacturing Technology, Jul. 15, 2014, pp. 679-701, vol. 63, No. 2, Elsevier BV, Netherlands.
CN Office Action Mailed on Oct. 13, 2023 for CN Application No. 202111130986, 5 page(s).
English Translation of CN Office Action dated Oct. 13, 2023 for CN Application No. 202111130986, 7 page(s).
CN Office Action, including Search Report Mailed on Mar. 30, 2023 for CN Application No. 202111130986, 8 page(s).
English Translation of CN Office Action, including Search Report dated Mar. 30, 2023 for CN Application No. 202111130986, 10 page(s).
CN Office Action Mailed on Mar. 26, 2024 for CN Application No. 202111130986, 5 page(s).
English Translation of CN Office Action dated Mar. 26, 2024 for CN Application No. 202111130986, 9 page(s).
CN Notice of Allowance Mailed on Aug. 22, 2024 for CN Application No. 202111130986, 4 page(s).
Decision of Reexamination revoking the Decision on Rejection Mailed on Jul. 26, 2024 for CN Application No. 202111130986, 1 page(s).
English translation of CN Notice of Allowance dated Aug. 22, 2024 for CN Application No. 202111130986, 4 page(s).
English Translation of Decision of Reexamination revoking the Decision on Rejection dated Jul. 26, 2024 for CN Application No. 202111130986, 1 page(s).
EP Office Action Mailed on Jul. 11, 2024 for EP Application No. 21199009, 12 page(s).

* cited by examiner

CLOSED LOOP SOLUTION FOR LOADING/UNLOADING CARTONS BY TRUCK UNLOADER

TECHNOLOGICAL FIELD

Example embodiments of the present invention relate generally to a truck unloader, and, more particularly, to a closed looped solution for an unloading operation of the truck unloader.

BACKGROUND

Trucks and trailers loaded with cargo and products move across the country to deliver products to commercial loading and unloading docks at stores, warehouses, and distribution centers. Trucks can have a trailer mounted on the truck or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically loaded and unloaded with forklifts if the loads are palletized and with manual labor if the products are stacked within the trucks. Unloading large truck shipments manually with human laborers can be physically difficult and can be costly due to the time and labor involved. In addition, hot or cold conditions within a confined space of a truck trailer or shipping container can be deemed unpleasant work. Consequently, a need exists for an improved unloading system that can unload bulk quantities of the cargo and products from truck trailers more quickly than human laborers and at a reduced cost.

In order to be economical, automation of loading or unloading needs to be relatively fast. Generally known approaches to unloading cargo and products from truck trailers is by performing a sweeping operation by the truck unloader. However, such sweeping operation are subjected to several drawbacks if performed in a random manner. Some of the drawbacks, for example, may be integrity of packaging and contents of the cargo and products may be jeopardized, wait time or down time between sweeping operations may make it difficult to achieve an economical return on investment (ROI) for an automated unloading using the truck unloader, increased susceptibility of the cargo and products being damaged during the sweeping operation, etc. Through applied effort, ingenuity, and innovation, many of these identified problems have been solved by developing solutions that are included in embodiments of the present disclosure, many examples of which are described in detail herein.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a truck unloader for unloading cartons from a carton pile includes a robotic arm with a front portion comprising one or more sensors. A controller including a detection system configured to periodically receive one or more images from a vision system. A processor subsystem in connection with the detection system configured to: calculate a distance from at least a portion of the truck unloader to the carton pile based on the one or more images and. advance the truck unloader to perform a sweeping operation based on the distance in an instance in which the distance satisfies a predefined distance threshold. The processor subsystem further configured to monitor a torque input received as a feedback from the one or more sensors while performing the sweeping operation, wherein the sweeping operation is configured to continue until the torque input exceeds a predefined torque threshold.

Various example embodiments described herein relate to a truck unloader, wherein the front portion comprises a front-end roller and a conveyor.

Various example embodiments described herein relate to a truck unloader, wherein the front portion performs the sweeping operation by pulling the one or more cartons onto the conveyor.

Various example embodiments described herein relate to a truck unloader, wherein the one or more sensors are torque/force sensors configured to measure the torque when the front portion contacts the carton pile.

Various example embodiments described herein relate to a truck unloader, wherein a value of the torque input varies during each sweep operation based on one of a carton dimension or packing arrangement of the carton pile or a wall of a carton pile container.

Various example embodiments described herein relate to a truck unloader, wherein the vision system comprises one or more sensors attached respectively to one of a mobile body or the robotic arm to provide a two-dimensional (2D) image and a three-dimensional (3D) point cloud.

Various example embodiments described herein relate to a truck unloader, wherein the processing subsystem is further configured to perform transformations on the 3D point cloud data from a camera coordinate frame to a robot coordinate frame to calculate the distance.

Various example embodiments described herein relate to a truck unloader, wherein the processing subsystem is further configured to perform Euclidean clustering on the transformed 3D point cloud data to calculate the distance.

Various example embodiments described herein relate to a truck unloader, wherein the front portion is further configured to halt the sweeping operations when the torque input exceeds the pre-defined torque threshold.

Various example embodiments described herein relate to a controller for controlling a truck unloader for unloading cartons from a carton pile. The controller includes a detection system configured to periodically receive one or more images from one or more sensors and a processor subsystem in connection with the detection system configured to: calculate a distance from at least a portion of the truck unloader to the carton pile based on the one or more images and advance the truck unloader to perform a sweeping operation based on the distance in an instance in which the distance satisfies a predefined distance threshold. The processor subsystem further configured to monitor a torque input received as a feedback from one or more torque sensors while performing the sweeping operation, wherein the sweeping operation is configured to continue until the torque input exceeds a predefined torque threshold.

Various example embodiments described herein relate to a controller, wherein the processor subsystem further comprises: a segmentation module and a distance generation module configured to calculate the distance between a front portion of the truck unloader and a portion of the caron pile.

Various example embodiments described herein relate to a controller, wherein the processor subsystem further comprises a point cloud accumulation and filtering module to accumulate the 3D point cloud data of the one or more sensors.

Various example embodiments described herein relate to a controller, wherein the processor subsystem is further configured to estimate a pose of a robotic arm and the front portion of the truck unloader using forward kinematics.

Various example embodiments described herein relate to a method for controlling a truck unloader to unload a set of cartons. The method includes receiving a plurality of images from one or more sensors on the truck unloader and computing a distance to advance the truck unloader based on the plurality of images to perform a sweeping operation. The method further includes receiving a torque input as a feedback in response to the truck unloader performing the sweeping operation by advancing towards the set of cartons based on the distance. In response to determining that the torque input is within a pre-defined torque threshold, transmitting a first instruction to perform the sweeping operation when the distance is greater than a pre-defined distance threshold and computing another distance to advance the truck unloader, wherein the distance is calculated recursively before each sweeping cycle. In response to determining that the torque input exceeds the pre-defined torque threshold, determining whether to perform a picking operation or the sweeping operation or transmitting a second instruction to perform a picking operation when the distance is less than the pre-defined distance threshold.

Various example embodiments described herein relate to a method for controlling a truck unloader to unload a set of cartons, wherein determining the torque input is within a pre-defined torque threshold further includes determining whether the distance exceeds the pre-defined distance threshold. In response to determining that the torque input is within the pre-defined torque threshold and the distance exceeding the pre-defined distance threshold, performing a second sweeping operation. In response to determining that the torque input exceeds the pre-defined torque threshold or the distance is below the pre-defined distance threshold, determining whether to perform a third sweeping operation or a picking operation.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
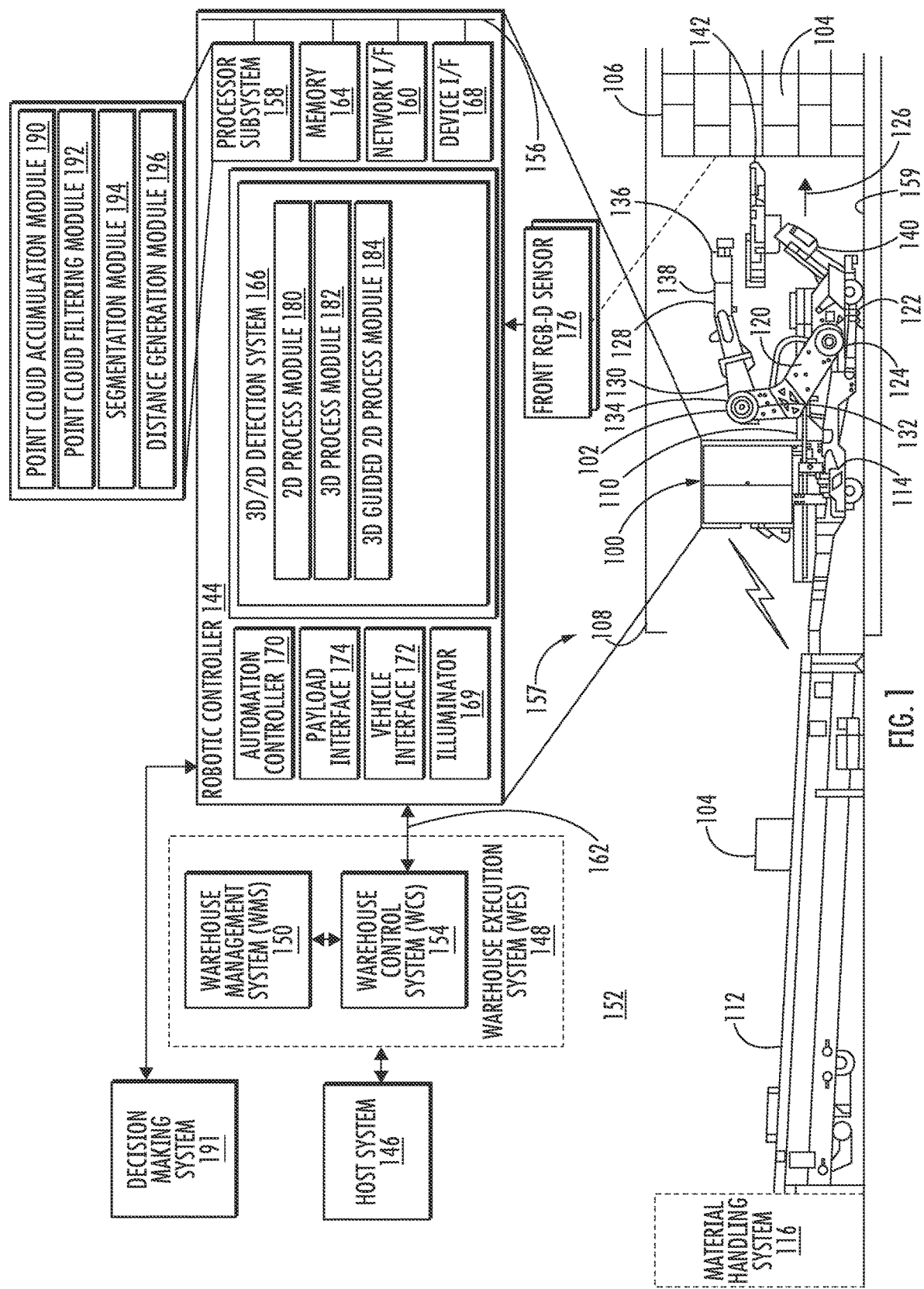
FIG. 1 illustrates a side view with functional block diagram of a truck unloader system unloading cartons from a carton pile within a truck trailer using a vision system, in accordance with an embodiment of the present subject matter.

The present invention now will be described more fully hereinafter with reference to the accompanying drawings in which some but not all embodiments of the inventions are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside," etc. are used for explanatory purposes in the examples provided below to describe the relative position of certain devices or portions of devices. Terminology used in this patent is not meant to be limiting insofar as devices described herein, or portions thereof, can be attached or utilized in other orientations.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase can be included in at least one embodiment of the present invention, and can be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, can mean that specific number, or alternatively, a range in proximity to the specific number, as understood by persons of skill in the art field.

If the specification states a component or feature "can," "can," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors can be provided, such as one processor dedicated to wireless communication functions and one processor dedicated to running other applications. Software applications can be stored in the internal memory before they are accessed and loaded into the processors. The processors can include internal memory sufficient to store the application software instructions. In many devices the internal memory can be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory can be any non-transitory computer readable medium having computer readable instructions (e.g., computer program instructions) stored thereof that are executable by a processor.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" or "server" or "supervisor device" used interchangeably for the purpose of brevity. The term "server" can be used herein to refer to any computing device or a distributed network of computing device capable of functioning as a server, such as a master exchange server, web server, mail server, document server, or any other type of server. A server can be a dedicated computing device or a computing device including a server module (e.g., running an application which can cause the computing device to operate as a server). A server module (e.g., server application) can be a full function server module, or a light or secondary server module (e.g., light or secondary server application) that is configured to provide synchronization services among the dynamic databases on computing devices. A light server or secondary server can be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the server can correspond to any of, an industrial computer, a cloud computing-based platform, an external computer, a standalone computing device, and/or the like. In some example embodiments, the master device or the computing platform can also refer to any of the electronic devices, as described herein. In some example embodiments, the server can include an access point or a gateway device that can be capable of communicating directly with one or more electronic devices and can also be capable of communicating (either directly or indirectly via a communication network such as the Internet) with a network establishment service (e.g., Internet service provider). In some example embodiments, the server can manage the deployment of one or more electronic devices throughout a physical environment. In some example embodiments, the server can refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

In some example embodiments, the term "server" can be used herein to refer to any one of or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The components illustrated in the figures represent components that may or may not be present in various embodiments of the invention described herein such that embodiments can include fewer or more components than those shown in the figures while not departing from the scope of the invention.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Throughout the specification, the terms "robotic arm", "robot arm", "robotic arm assembly", and "end-effector" may be used interchangeably to refer to the robotic arm with 4 to 6 axis degree of freedom (DOF).

Throughout the specification, the terms "torque input", "torque feedback", "torque output", "torque value" may be used interchangeably to refer to the torque value from the torque/force sensor.

Throughout the specification, the terms "carton pile container", "container", "truck trailer" may be used interchangeably to refer to the container within which the carton pile is stacked.

A sweeping operation and/or a picking operation are crucial operations for the truck unloader for unloading cartons from a carton pile within the truck trailer. Generally, the sweeping operation is performed on the cartons located at the floor level and the picking operation is performed on the cartons at a certain height above the floor level.

Traditionally such sweeping operation or picking operation may be performed by the truck unloader using an approach known as 'sense-plan-act'. For example, a vision system may capture an image of the carton pile before unloading the cartons followed by processing the image to determine a motion plan. Accordingly, the truck unloader may unload the cartons from the carton pile as per the motion plan. In this regard, when using the 'sense-plan-act' approach, the truck unloader determines, in some examples, the motion plan based on a single image before starting the unloading operation, which may cause the truck unloader to be unaware of the changes in the unloading environment around the truck unloader while performing the unloading operation. Further, when using the 'sense-plan-act' approach, there exists a latency or time delay in processing the image and determining the motion plan. The truck unloader may remain idle during this time delay, which, may affect the unloading throughput. As the truck unloader is unaware of the changes in the unloading environment, the truck unloader may lack the decision-making capability to choose between the sweeping operation and picking operation for unloading cartons. This decision may affect the unloading throughput as the sweeping operation is capable of accumulating the most volume of cartons from the carton pile compared to the picking operation. Further, when using the 'sense-plan-act' approach, the truck unloader may capture additional images in between the unloading operation, however such images may be subjected to further processing to determine an alternate motion plan, which in turn may call for the truck unloader to remain idle during the processing. In this regard, the 'sense-plan-act' approach fails to continuously monitor the unloading environment and lacks the decision-making capability to choose between the sweeping and picking operation without affecting the unloading throughput while minimizing the idle time of the truck unloader.

In some examples, and as disclosed herein, a truck unloader uses a closed loop-based solution executed by a robotic controller of the truck unloader. The solution, in some examples, enables a vision system on the truck unloader to continuously monitor the unloading environment by accumulating the images captured before and while performing the unloading operation. The solution determines a distance the truck unloader may travel to perform a continuous sweeping operation based on processing the accumulated images. Further, the solution decides to continue performing the continuous sweeping operation based on a torque feedback from one or more sensors on a front end of the truck unloader.

In some examples, the torque feedback may provide the decision-making capability that allows the truck unloader to switch from the sweeping operation to the pick operation, switch from the pick operation to the sweeping operation, and/or halt the sweeping operation. In this regard, the solution dynamically updates the distances the truck unloader must travel for performing the continuous sweeping operation based on processing the images accumulated after each sweep operation. Such continuous sweeping operation may be performed based on the updated distances until the torque feedback exceeds a certain threshold value. Accordingly, the truck unloader may be aware of the unloading environment by continuously updating the distances based on periodic capturing of the images. The truck unloader may decide to perform the sweeping operation continuously based on the torque feedback and the updated distances without affecting the throughput while minimizing the idle time.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

FIG. 1 illustrates a truck unloader 100, having a manipulator such as a robotic arm or an end effector 102, that unloads cartons 104 from a carton pile 106 inside of a carton pile container 108, such as a truck trailer, shipping container, storage unit, etc. Robotic arm 102 places the cartons 104 onto a conveyor system 110 of the truck unloader 100 that conveys the cartons 104 back to an extendable conveyor 112 that follows a mobile body 114 of the truck unloader 100 into the carton pile container 108. The extendable conveyor 112 in turn conveys cartons 104 to a material handling system 116 such as in a warehouse, store, distribution center, etc.

In one or more embodiments, the truck unloader 100 autonomously unloads a carton pile 106 resting on a floor 118 of the carton pile container 108. The mobile body 114 is self-propelled and movable across the floor 118 from outside to the innermost portion of the carton pile container 108. Right and left lower arms 120 of the robotic arm assembly 102 are pivotally attached at a lower end 122 respectively to the mobile body 114 on opposing lateral sides of the conveyor system 110 passing there between. The right and left lower arms 120 rotate about a lower arm axis 124 that is perpendicular to a longitudinal axis 126 of the conveyor system 110. An upper arm assembly 128 of the robotic arm assembly 102 has a rear end 130 pivotally attached at an upper end 132 respectively of the right and left lower arms 120 to pivotally rotate about an upper arm axis 134 that is perpendicular to the longitudinal axis 126 of the conveyor system 110 and parallel to the lower arm axis 124. A manipulator head 136 is attached to a front end 138 of the upper arm assembly 128 and engages at least one carton 104 at a time from the carton pile 106 for movement to the conveyor system 110. The pivotal and simultaneous mirrored movement of the right and left lower arms 120 maintains the upper arm axis 134 at a relative height above the conveyor system 110 that enables the at least one carton 104 to be conveyed by the conveyor system 110 without being impeded by the robotic arm assembly 102 as soon as the manipulator head 136 is clear. In one or more embodiments, the truck unloader 100 includes a lift 140 attached between the mobile body 114 and a front portion 142. The lift 140 moves the front portion 142 relative to the floor 118 to reduce spacing underneath the at least one carton 104 during movement from the carton pile 106 to the conveyor system 110. The front portion 142, for example, may include a conveyor 111. The front portion may be hingedly attached through one or more joints to a base or the mobile body 114 of the truck unloader 100.

The manipulator head 136 can include an array of vacuum suction cups (not shown). Each of the vacuum suction cups can be configured to be actuated so as to move forward and/or backward from its initial position to grab an item based on vacuum suction force. In this regard, a picking operation of the truck unloader 100 may be performed by the suction cups. Further, the front portion 142 can be configured to be movably positioned so that a section of the front portion 142 can sweep below a portion of one or more cartons, thereby pulling the one or more cartons onto the conveyor 111 of the front portion 142 of the truck unloader 100. In this regard, the front portion 142 can include one or more mechanical components configured to move in any of directions X, Y, and/or Z depending on a requirement to pull the one or more cartons. In this regard, a sweeping operation or action of the truck unloader 100 may be performed using the front portion 142. In some examples, for performing the sweeping action, the truck unloader 100 lowers the front portion down and pushes it up to the carton pile, while the cartons that has been displaced on the front portion 142, gets conveyed by the conveyor 111.

In some examples, the front portion 142 may include one or more front rollers 143 that may be provided on an end of the conveyor 111 to contact cartons and rotate to pull the cartons on the conveyor 111. In some examples, the rollers 144 may be extended from or retracted towards the conveyor 111 to move away from cartons of the carton pile. Alternately, the front roller 143 may be placed against the pile of cartons to support the carton pile while the robotic arm 102 unloads the cartons. According to an embodiment, the front portion 142 includes one or more torque/force sensors to measure the torque. In some examples, the torque/force sensors may be positioned on the front roller 143 to measure the torque exerted on the front roller 143 when contacting the cartons during the unloading operation. In some examples, the torque/force sensors may be any sensor generally known in the art designed to monitor, detect, record and regulate linear and rotational forces exerted upon it. The torque/force sensors may enable truck unloader 100 to detect force and torque applied on the front portion 142. For example, a torque value may differ when the front portion 142 of the truck unloader 100 sweeps loosely packed cartons and tightly packed cartons from the floor and/or the carton pile. In other words, the torque value may differ based on the packing arrangement of the cartons in the caron pile. In some examples, the torque value may differ during each sweep operation based on carton dimensions. In some examples, a substantial difference in torque value may be noted when the front portion 142 contacts an obstacle such as a wall of the truck trailer 108 behind the carton pile.

A higher-level system can assign an autonomous robotic vehicle controller 144 (hereinafter referred to as robotic controller 144) of the truck unloader 100 to a particular carton pile container 108 and can receive information regarding progress of loading/unloading as well as provide a channel for telecontrol. A human operator could selectively intervene when confronted with an error in loading or unloading. The higher-level system can include a host system 146 that handles external order transactions that are to be carried out by the material handling system 116. Alternatively or in addition, a warehouse execution system (WES) 148 can provide vertical integration of a warehouse management system (WMS) 150 that performs order fulfillment, labor management, and inventory tracking for a facility 152 such as a distribution center. WES 148 can include a vertically integrated warehouse control system (WCS) 154 that controls automation that carries out the order fulfillment and inventory movements requested by the WMS 150. According to an embodiment, the higher-level system may include a decision-making system 191 communicable connected to the robotic controller 144. According to another embodiment, the decision-making system 191 may be installed or provisioned as a subsystem within the robotic controller 144. The decision-making system 191 may decide whether to perform a picking operation or a sweeping operation and communicate the decision to the robotic controller 144. The decision-making system 191 may be a computer system or a cloud computing system which includes one or more processors and memory/database to execute one or more algorithms, such as, but not limited to an image processing algorithm, machine learning algorithm, and the like.

The truck unloader 100 may include a vision system that comprises one or more sensors 176 (e.g., cameras, microphones, RGB-D sensors, LiDAR (Light detection and ranging) sensors etc.). The vision system may be used to scan in front of the truck unloader 100 in real time or near real time. The forward scanning may be triggered in response to the truck unloader 100 being in position to begin detecting cartons in the unloading environment. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the sensors 176 may also provide depth perception, edge recognition, and may create a 3D image of a wall of cartons (or carton pile). In some examples, the one or more sensors 176 may be installed on the robotic arm 102. The processor subsystem 158 may operate in conjunction with the detection system 166 to recognize edges, shapes, and the near/far distances of articles in front of the truck unloader 100. For example, the edges and distances of each separate carton in the wall of cartons may be measured and calculated relative to the truck unloader 100. Such distance calculations will be performed by the processor subsystem 158. The processor subsystem 158 can include various applications or software modules or components that perform processes described later in the present application. According to an embodiment, the processor subsystem 158 includes a point cloud accumulation module 190, a point cloud filtering module 192, a segmentation module 194, and a distance generation module 196.

In one or more embodiments, once assigned by the WES 148 or manually enabled, the truck unloader 100 can operate autonomously under control of the robotic controller 144 in:

(i) moving into a carton pile container 108, (ii) performing one of loading or unloading the carton pile container 108, and (iii) moving out of the carton pile container 108. In order to navigate within the carton pile container 108 and to expeditiously handle cartons 104 therein, the sensors 176 may be attached respectively to one of the mobile body 114 and the movable robotic manipulator (i.e., robotic arm assembly 102) to provide a two-dimensional (2D) image and a three-dimensional (3D) point cloud of at least one portion of the carton pile 106 resting on a floor 159 of the carton pile container 108. Further, the sensors 176 provide a two-dimensional (2D) image and a three-dimensional (3D) point cloud of at least a portion of the truck unloader 100. Further, the sensors 176 provide a two-dimensional (2D) image and a three-dimensional (3D) point cloud of at least a portion of the floor 159 and the wall of the carton pile container 108. The carton pile container 108 can be stationery or mobile, such as transportation carriers for highway, railway or shipping on navigable waters.

In some examples, the detection system 166 may be a 3D/2D detection system 166 which can include depth sensing using binocular principles, lidar principles, radar principles, or sonar principles. To avoid dependency on consistent ambient lighting conditions, an illuminator 169 can provide a consistent or adjustable amount of illumination in one or more spectrum bandwidths such as visual light or infrared. The illumination can be narrowly defined in the visual spectrum enabling filtration of most of the ambient light. Alternatively, the illumination can be outside of the visual range such that the illumination is not distracting to human operators. The 3D/2D detection system 166 can receive 2D and 3D sensor data from the RGB-D sensors 176 that view an interior of the carton pile container 108 and the carton pile 106 and at least a portion of the truck unloader 100. For these and other purposes, the 3D/2D detection system 166 can include various applications or components that perform processes described later in the present application. For example, the 3D/2D detection system 166 can include a 2D process module 180, a 3D process module 182, and a 3D-guided 2D process module 184.

The robotic controller 144 provides an exemplary environment within which one or more of the described features of the various embodiments of the disclosure can be implemented. The controller 144 can be implemented as a unitary device or distributed processing system. The controller 144 includes functional components that communicate across a system interconnect of one or more conductors or fiber optic fabric that for clarity is depicted as a system bus 156. System bus 156 may include a data bus, address bus, and control bus for communicating data, addresses and control information between any of these coupled units. Functional components of the controller 144 can include a processor subsystem 158 consisting of one or more central processing units (CPUs), digital signal processor/s (DSPs) and processor memory. Processor subsystem 158 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system.

In accordance with various aspects of the disclosure, an element, or any portion of an element, or any combination of elements may be implemented with the processor subsystem 158 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

The robotic controller 144 may include a network interface (I/F) device 160 that enables controller 144 to communicate or interface with other devices, services, and components that are located external to controller 144, such as WES 148. These networked devices, services, and components can interface with controller 144 via an external network, such as example network 162, using one or more communication protocols. Network 162 can be a local area network, wide area network, personal area network, and the like, and the connection to and/or between network and controller 144 can be wired or wireless or a combination thereof. For purposes of discussion, network 162 is indicated as a single collective component for simplicity. However, it is appreciated that network 162 can comprise one or more direct connections to other devices as well as a more complex set of interconnections as can exist within a wide area network, such as the Internet or on a private intranet. For example, a programming workstation can remotely modify programming or parameter settings of controller 144 over the network 162. Various links in the network 162 can wired or wireless. Controller 144 can communicate via a device interface 168 with a number of on-board devices such as lights, indicators, manual controls, etc. Device interface 168 can include wireless links and wired links. For example, the controller 144 can direct the extendable conveyor 112 follow the truck unloader 100 into the carton pile container 108 or to lead the truck unloader 100 out of the carton pile container 108.

The robotic controller 144 can include several distributed subsystems that manage particular functions of the truck unloader 100. An automation controller 170 can receive location and spatial calibration information from the detection system 166 and use this data to coordinate movement of the mobile body 114 via a vehicle interface 172 and movement by payload components such as robotic arm assembly 102 and the lift 140 that moves the front portion 142 of the conveyor system 110. According to an embodiment the truck unloader 100 may be of the type disclosed in U.S. Pat. No. 10,336,562, which is incorporated herein by reference in their entirety.

System memory 164 can be used by processor subsystem 158 for holding functional components such as data and software such as the 3D/2D detection system 166. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 164 can include both random access memory, which may or may not be volatile, nonvolatile data storage. System memory 164 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 2:
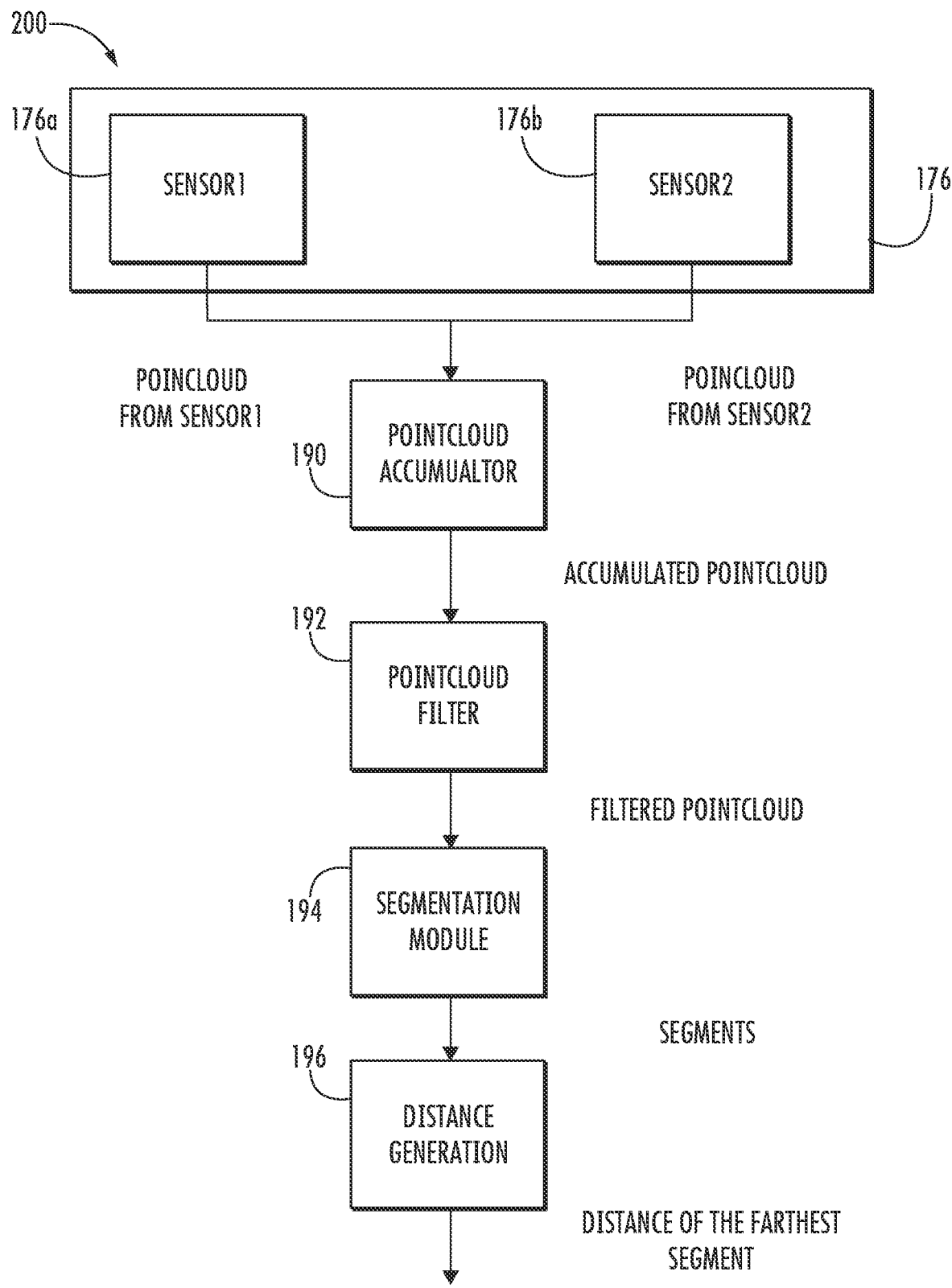
FIG. 2 illustrates a functional block diagram depicting modules involved in processing the images from the sensors, in accordance with an embodiment of the present subject matter.

FIG. 2 illustrates a functional block diagram depicting modules involved in processing the images from the sensors, in accordance with an embodiment of the present subject matter. As discussed previously, the sensors 176 may be used to capture the images of the unloading environment. The unloading environment, for example, may be a carton pile, a wall of the truck trailer 108 and the truck unloader 100. For example, the sensors 176 may capture the images of a location in front of the robotic arm assembly 102 (e.g., a portion of the carton pile rested on the floor, a portion of the floor, a portion of the wall, and at least a portion of the truck unloader 100). In some examples, the portion of the truck unloader 100 may be the front portion 142 of the truck unloader 100 which perform the sweeping operation.

In some examples, the sensors 176 may take the form of multiple sensors, such as sensors 176a, 176b. In some examples, the sensors 176a, 176b are capable of providing both 2D and 3D images. According to an embodiment, the sensors 176a, 176b are capable of continuously capturing the images before starting the unloading process and while performing the unloading process. The images captured by the sensors 176a, 176b may serve as an input for the truck unloader 100 for performing the sweeping operation and/or the picking operation. As shown in FIG. 2, the captured images from the sensors 176a, 176b are subjected to further processing by the processor subsystem 158. As discussed earlier, the processor subsystem includes a point cloud accumulation module 190, a point cloud filtering module 192, a segmentation module 194, and a distance generation module 196

According to an embodiment, point cloud information of the images captured by the sensors 176a, 176b are accumulated by the point cloud accumulating module 190. In some examples, the point cloud information is a set of data points that are representative of the unloading environment. The points may represent a 3D shape. Each point has its own set of X, Y and Z coordinates and in some cases additional attributes. In some examples, the sensors 176a, 176b may be LiDAR (Light Detection and Ranging) sensors which may be used for gathering the point cloud information of the unloading environment. In some examples, the unloading environment may include the carton pile, the front portion of the truck unloader 100, the wall of the truck trailer 108, etc.

In some examples, the LiDAR sensors 176a, 176b can be mounted to the robotic arm 102 or robot base (i.e., the base of the truck unloader 100) and are configured to transmit laser pulses to the carton pile and once the laser returns back, the LiDAR sensors 176a, 176b will record the data points. The data points from the LiDAR sensors 176a, 176b can be combined to create the point cloud information.

The point cloud accumulating module 190 may accumulate the point cloud information from the sensors 176a, 176b to create a larger point cloud. For example, the data points from the first sensor 176a may be 300 data points and from the second sensor 176b may be 300 data points. These data points are combined to form the larger point cloud of, for example, 600 data points.

The data points may include X, Y and Z coordinates, Z representing the distance of the carton pile (or the target carton) with reference to a location of the sensors 176a, 176b. Since the reference point for capturing the images is from the sensors 176a, 176b, the resulting point cloud data is representative of a camera coordinate frame (i.e., in a viewpoint which is different for each sensor 176a, 176b). As such, the 300 data points from the first sensor 176a may include a Z value different from the 300 data points from the second sensor based on the viewpoint of these sensors 176a, 176b from their respective locations. Such difference in Z values is due to capturing of the data points from the camera coordinate frame. Therefore, the data points may be transformed into a robotic coordinate frame to provide a common reference point for the Z value. Such transformation to the robotic coordinate frame will provide Z values which may represent the distance from a robot base to the carton pile rather than representing distance from the sensors 176a, 176b. The point cloud data may be transformed in a viewpoint of the robot base which may be a reference point or the starting point of the point cloud data.

In some examples, the point cloud information from the sensors 176a, 176b may be transformed so that each view appears to be originating from a common perspective point. The common perspective point, for example, may be the viewpoint from the robot base.

According to an embodiment, the transformation of the images (i.e., 3D point clouds in the camera coordinate frame) from the sensors 176a, 176b to the robot base (i.e., 3D point clouds in the robotic coordinate frame) may be performed by Forward Kinematics. In some examples, the forward kinematics refers to the use of a set of kinematic equations for a robot to compute the position of the robotic arm or the end-effector from pre-defined values for joint parameters. The joint parameters may be a known position information values of the robot joints, such as robotic arm joint angles or elbow joint angles. Such information may be obtained from the robot joint encoders positioned in the robotic arm. In this regard, the joint parameter information is provided as an input to compute a position or a pose of the robotic arm using the forward kinematics. With a priori knowledge of the location of the sensors 176a, 176b on the robotic arm, the forward kinematics outputs a transformation from the base to the sensors 176a, 176b on the robotic arm. In this regard, the data points from the camera coordinate frame (i.e., provided by the sensors 176a, 176b) are transformed to robotic coordinate frame (i.e., provided by the transformation of the images with respect to the robot base) such that each view appears to be originating from the common perspective point of the robot base. A person skilled in the art would understand that the any type of kinematics may be employed to rotate and transform the 3D point clouds with reference to the robot base. According to an embodiment, the larger point cloud is formed in the point cloud accumulation module 190 by applying the transformations to the data points accumulated from the sensors 176a, 176b. As discussed in the previous example, the transformation may be applied to the 600 data points accumulated at the point cloud accumulation module 190 such that the processing time for transforming the 300 data points separately from each sensor 176a, 176b is reduced.

According to an embodiment, forward kinematics may be used to compute the position of the front portion 142 of the truck unloader 100. In some examples, the front portion 142 of the truck unloader 100 may be used for performing the sweeping operation. The front portion 142 may be hingedly connected to the robot base. The position of the front portion 142 of the truck unloader 100 may be computed by the kinematic equation based on pre-defined values for joint parameters of the front portion 142. The joint parameters may be a known position information values of the robotic joints, such as the joint angles of the robotic joints of the front portion 142. Such information is obtained from the robot joint encoders positioned in the truck unloader 100. In this regard, the joint parameter information is provided as an input to compute a position or a pose of the front portion 142 using the forward kinematics. With a priori knowledge of the transformation from the base to the sensors 176a, 176b on the robotic arm 102, the forward kinematics outputs a transformation from the robot base to the front portion 142. As discussed in the previous example, the transformation may be applied to the 600 data points accumulated such that the Z value may represent the distance from the robot base to the carton pile in the robot coordinate frame rather than representing the distance from the viewpoint of the sensors 176a, 176b in the camera coordinate frame. In this regard, the pose of the robotic arm 102 and the pose of the front portion 142 is obtained using Forward Kinematics. The pose information may be indicative of the X, Y, Z coordinate information of the robotic arm 102 and the front portion 142. In this regard, the data points in the large point cloud may be transformed into the robot coordinate frame along with the determination of the X, Y, Z coordinate information of the robotic arm 102 and the front portion 142.

According to an embodiment, the point cloud filtering module 192 filters out portions of the larger point cloud data by utilizing bilateral filters and blurring functionalities as known in the art to improve the efficiency in detecting an actual region of interest. In some examples, the front portion 142 or the robotic arm 102 may be filtered out from the remaining portions of the unloading environment to produce a point cloud with the actual region of interest. For example, since the X, Y, Z coordinate information of the robotic arm 102 and the front portion 142 is known, the filtering module may filter out data points indicative of the robotic arm and the front portion and classify the remaining data points to be the unloading environment. In some examples, the unloading environment is indicative of the floor, the carton pile and the wall of the truck trailer. For example, let us assume the Z value after transformation of the data points to the robot coordinate frame represent the distance from the robot base (i.e., the reference point) to the carton pile. Let us assume, the distance from the robot base to the carton pile is 6 meters. Now, the Z value of the front portion 142 from the robot base (i.e., the reference point) is 4 meters. Then, the point cloud filtering module may filter out the data points which are below 4 meters from the robot base and classify the data points above 4 meters from the robot base as the actual region of interest. The data points which are below 4 meters may be front portion 142 and other portions of the robot while the data points above 4 meters may be the unloading environment. The filtered point cloud data with the actual region of interest is communicated to the segmentation module 194.

According to an embodiment, the segmentation module 194 segments the filtered point cloud data into clusters. In some examples, the segmentation module may employ a Euclidean clustering algorithm generally known in the art to segment the filtered point cloud data into multiple clusters. For example, the clusters represent individual cartons, floor or wall of the truck trailer. In some examples, a threshold may be selected for the maximum number of data points in a cluster and the clusters may be divided as per the threshold. For example, 300 data points may be clustered with 15 data points being the maximum threshold for qualifying for a cluster. According to an embodiment, the distance generation module 196 may identify seed points within the clusters called as cluster centroids. In some examples, the distance generation module 196 may employ a centroid-based averaging algorithm known in the art for identifying a centroid of each clusters. For example, a center point of each cluster may be referred to as the centroid. The algorithm may calculate average of all data points in the cluster and moves the centroid to that average location. This calculation may be performed for all the clusters in the filtered point cloud yielding a centroid for each cluster. After the centroid for each cluster is located, the algorithm further calculates a distance between the clusters. For example, the distance between the clusters is the distance between the centroid of each cluster. The distances can be calculated using any technique known in the art, for example, cosine distance or Euclidean distance. In some examples, a first cluster is represented as N and then neighboring clusters as N-1, N-2 and so on. The distances between these clusters N and N-1 or N-1 and N-2 may be calculated using the centroid of each cluster, N may be indicative of the first carton in the carton pile, N-1 being indicative of the second carton and so on. As discussed previously, these clusters N, N-1, N-2 are viewed from the common perspective point (i.e., from the robot base as the reference point) achieved by the transformations using the Forward Kinematics. Further, the X, Y, Z coordinate information of the front portion 142 is known using the Forward Kinematics. In this regard, the distance of any cluster N, N-1, N-2 from the robot base may be calculated considering the X, Y, Z coordinate information of the front portion 142. For example, let us assume the Z value representing the distance from the robot base to the carton pile is 6 meters. Let us assume that as per coordinate information of the front portion 142, the Z value representing the distance from the robot base to an end point on the front portion 142 is 4 meters. The algorithm may calculate the distance from the end point on front portion 142 to the cluster N as (6meters−4 meters) 2 meters. Let us assume, the distance between the centroid of the cluster N and the cluster N-1 is 1 meter, then the algorithm may calculate the distance from the end point on the front portion 142 to the cluster N-1 as (2 meters+1 meter) 3 meters. In this regard, the distance between the front portion 142 and the clusters (i.e., the cartons) is determined for advancing the truck unloader 100 based on the distance. In some examples, N cluster may represent more than one carton arranged in a first row of the carton pile and the N-1 cluster may represent more than one carton arranged in a second row of the carton pile and son on. The truck unloader 100 may advance towards the carton pile to unload the cartons of each cluster based on the calculated distance. In some examples, the algorithm calculates the farthest cluster from the end point on the front portion 142. The farthest cluster may be the cluster (i.e., a carton or a truck wall) which is at a maximum distance from the end point on the front portion 142 or the robot base. In some examples, the maximum distance may indicate the distance the truck unloader 100 can advance to perform the sweeping operation on the clusters. The truck unloader may advance up to the maximum distance while sweeping the clusters N, N-1, N-2 sequentially. Various techniques exist in the art for efficiently computing the centroids for each cluster and calculating the distance between each centroid and the person skill in the art will recognize that any such techniques may be utilized.

In some examples, the process of accumulating, filtering, clustering and calculating distance may be performed by the processor subsystem 158 during each sweeping cycle. For examples, one sweeping cycle may be indicative of one or more sweeping operations or actions performed by the truck unloader 100 at a particular time period. The sensors 176a, 176b may continuously capture the images in each sweeping cycle with timestamps. Accordingly, the point cloud accumulation module 190, the point cloud filtering module 192, the segmentation module 194 and the distance generation module 196 may process the images based on the timestamps. For example, a first sweeping cycle comprises at least 3 sweeping actions to be performed by the truck unloader 100, the modules 190, 192, 194, 196 may process the images with a first-time stamp captured before initiating the first sweeping cycle. Accordingly, at an end of the first sweeping cycle, the modules 190, 192, 194, 196 may start processing the images with a second-time stamp captured before initiating a second sweeping cycle. In this regard, continuous sweeping actions may be performed using the images captured iteratively with varying timestamps.

Figure 3:
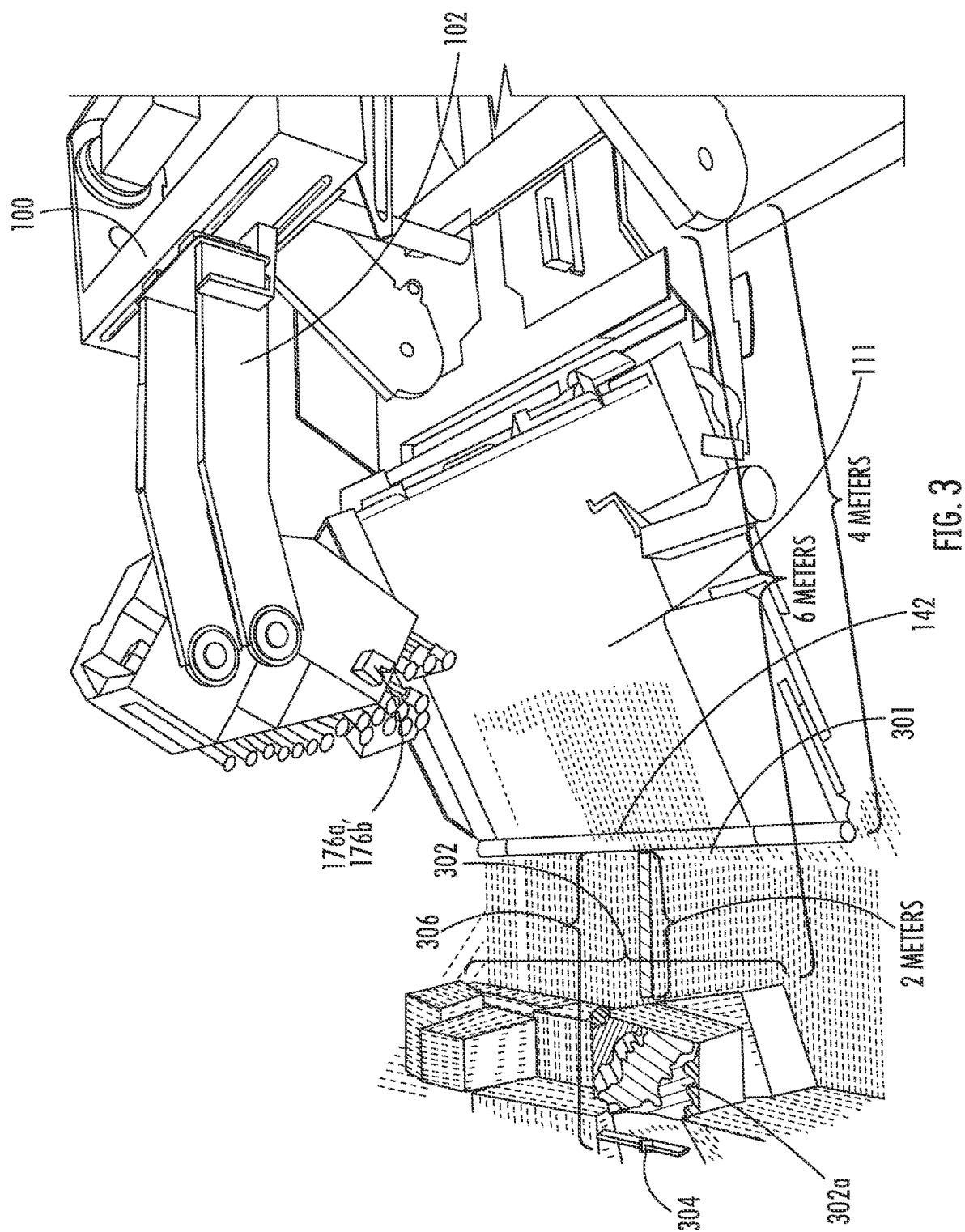
FIG. 3 illustrates an exemplary 3D point cloud view of the unloading environment with the truck unloader system, in accordance with an embodiment of the present subject matter.

FIG. 3 illustrates an exemplary 3D point cloud view of the unloading environment with the truck unloader, in accordance with an embodiment of the present subject matter. As shown in the example of FIG. 3, the actual regions of interest are the row of cartons 302 in the carton pile and the wall 304 of the truck trailer 108. The distance of the end point 301 of the front portion 142 from the base of the truck unloader 100 is known. As described above, the distance is known based on the transformation and coordinate information calculated from the Forward Kinematics. Let us assume for the purpose of ease of explanation, that the first cluster is the first carton 302a and the second cluster is the is the wall 304 of the truck trailer 108, which may be the farthest cluster from the front portion 142. As discussed above, the distance from the base of the truck unloader 100 to the carton pile may be 6 meters. The distance from the base of the truck unloader to the end point 301 of the front portion 142 may be 4 meters. The distance generation module 196 may calculate the distance from the end point 301 of the front portion 142 to the carton pile (i.e., the first carton 302a) to be 2 meters. The truck unloader 100 may advance the distance of 2 meters for performing the sweeping action. As discussed above, the distance generation module 906 may perform a comparison of the distances between the clusters using the centroid information to identify the farthest cluster. The distance between the base of the truck unloader to the farthest cluster (i.e., the wall) is represented as 306. The truck unloader 100 may continue to advance based on the distance 306 performing the sweeping operation until it reaches the farthest cluster.

In this regard and in some examples, the sweeping operation is performed based on the distances provided by the processor subsystem 158 in response to processing the images. In some examples, the sweeping operation may be performed without awaiting motion plan instructions from the decision-making system 191 for every sweeping cycle. In this regard, the control may be relayed to the decision-making system 191 from the processor subsystem 158 only when an error is encountered by the truck unloader 100 during the sweeping operation. Such control may be described further in conjunction with FIGS. 4 and 5.

Figure 4:
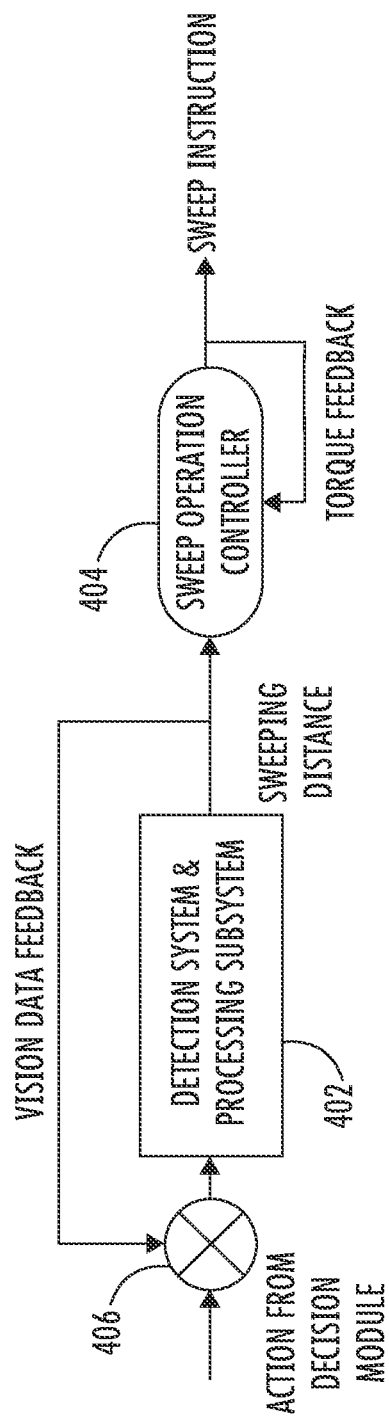
FIG. 4 illustrates an exemplary closed loop solution for sweeping operation performed by the truck unloader system of FIG. 1, in accordance with an embodiment of the present subject matter.

An exemplary flow diagram of a closed loop solution for performing continuous sweeping operation is depicted in FIG. 4. According to an embodiment, the closed loop solution includes a torque feedback in addition to the vision feedback from the sensors 176, 176b as described in conjunction with FIG. 2. According to an embodiment the torque feedback is provided by the torque/force sensor positioned on the front position 142 of the truck unloader 100. The torque value is monitored for every sweeping action performed by the truck unloader 100. At block 402, the detection system 166 and the processing subsystem 158 receives the images from the image sensors with varying timestamps. The processing system 158 accumulates the point cloud data from multiple images, transforms the images to the robot coordinate system and filters the point cloud data to identify the regions in the unloading environment other than the truck unloader 100. The processing subsystem 158 further segments the point cloud data into multiple clusters representing the cartons and calculates the distance of the cartons from the truck unloader 100 in every sweeping cycle to advance the truck unloader so as to perform the sweeping action.

The distance is communicated to the sweep controller at block 404 (i.e., the automation controller 170). Based on the calculated distance, the truck unloader 100 is advanced. A sweep operation is performed by the front portion 142 of the truck unloader 100 when advanced to the distance.

The truck unloader 100 continues to perform the sweep operation according to the distance while the sweep controller at block 404 monitors the torque feedback during each sweep operation. In this regard, the closed loop solution allows the truck unloader 100 to continuously perform the sweeping operation based on the captured images (e.g., vision feedback) and the torque feedback. The torque feedback is to ensure that the cartons are not subjected to any damage during the sweeping operation. According to an embodiment, the torque feedback is monitored by comparing with a predefined torque threshold to determine if a sweeping operation is feasible. According to an embodiment, the distance communicated to the sweep controller at block 404 is monitored against a predefined distance threshold to determine if a sweeping operation is feasible. The feasibility check performed by the closed loop solution during the sweeping operation is explained in conjunction with the flow chart of FIG. 5. Further, when the sweeping operation is not feasible, a decision is provided by the decision-making system 191 at block 406 to halt the sweeping operation or to perform a picking operation or shut down the truck unloader 100. Such decisions are made by the decision-making system 191 in response to the feasibility check, which is explained in conjunction with the flow chart of FIG. 5

Figure 5:
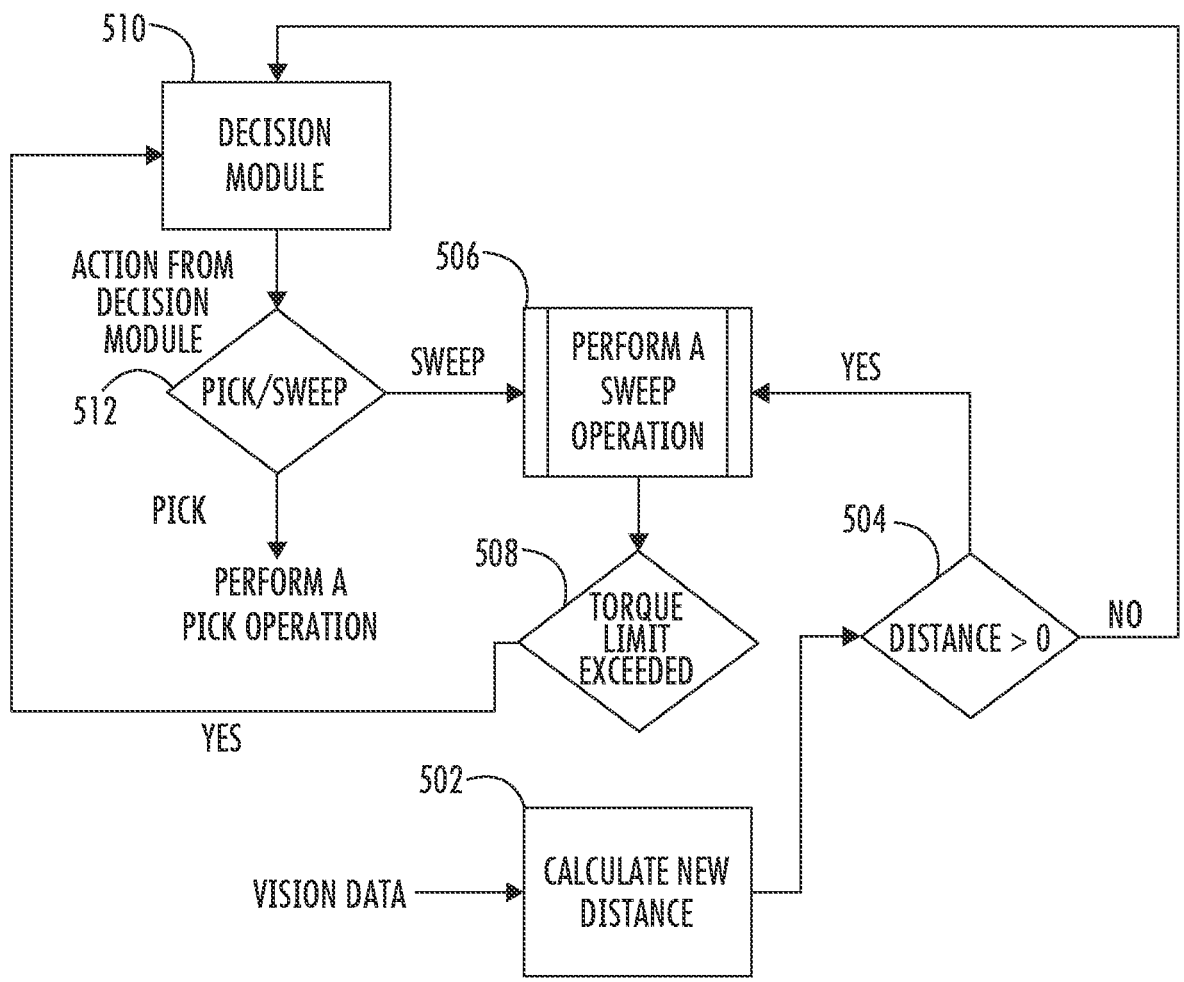
FIG. 5 illustrates an exemplary flow chart of the sweeping operation performed by the truck unloader system of FIG. 1, in accordance with an embodiment of the present subject matter.

FIG. 5 illustrates an exemplary flow chart of the sweeping operation performed by the truck unloader of FIG. 1, in accordance with an embodiment of the present subject matter. At block 502, the processor subsystem 158 in connection with the detection system 166 receives the images from the sensors 176a, 176b and dynamically calculates a distance from at least a portion of the truck unloader 100 to the carton pile based on processing the images in accordance with the example embodiment disclosed in FIG. 2. In some examples, at least a portion of the truck unloader 100 is the front portion 142 of the truck unloader 100. In some examples, the images are indicative of the unloading environment. In some examples, the distance is calculated iteratively before every sweeping cycle of the truck unloader 100.

At block 504, the processor subsystem 158 may compare the distance to a predefined distance threshold before performing the sweeping operation to determine the feasibility to perform the sweeping operation. For example, the pre-defined distance threshold may be zero. If the calculated distance is greater than zero, then the sweeping operation may be performed. In some examples, when the processor subsystem 158 is unable to detect the clusters within the point cloud data from the sensor 176a, 176b, then the processor subsystem 158 may be unable to calculate the distance to the cluster from the truck unloader 100 as there are no clusters (i.e., no cartons). In such scenario, the distance output from the processor subsystem 158 may be zero or less than zero. In this regard, sweep controller (i.e., the automation controller 170) may not perform the sweeping operation and the control may be relayed to the decision-making system 191. In some examples, when the truck unloader 100 is closer to the wall of the truck trailer 108, then the processor subsystem 158 is able to detect only one cluster which is indicative of the wall. In such scenario, the distance output from the processor subsystem 158 may be either zero or less than zero or greater than zero. If it is determined that the distance output either zero or less than zero, then the control may be relayed to the decision-making system 158 and the sweep operation may not be performed.

At block 506, the processor subsystem 158 may transmit an instruction to the sweep controller (i.e., the automation controller 170) to perform the sweeping operation by advancing the truck unloader 100 based on the calculated distance if the predefined distance threshold is satisfied at block 504. While the truck unloader 100 advances the calculated distance to perform the sweeping operation, the torque output is also monitored at block 508 when unloading the cartons during the sweeping operation. If it is determined that the torque output of the truck unloader 100 exceeds a predefined torque threshold, then the control is relayed back to the decision-making system 191. In other words, the front portion 142 of the truck unloader 100 is configured to continuously perform the sweeping operations based on the calculated distance until the torque input exceeds the pre-defined torque threshold with the calculated distance more than the pre-defined distance threshold. The pre-defined torque threshold may be a maximum torque value above which the truck unloader 100 may cause damage to either the front portion 142 or the cartons being unloaded.

As discussed in the previous example, when the truck unloader 100 is closer to the wall of the truck trailer 108, then the processor subsystem 158 detects only one cluster which is indicative of the wall. In such scenario, the distance output from the processor subsystem 158 may be either zero or less than zero or greater than zero. If it is determined that the distance output is greater than zero, the sweep controller may perform the sweep operation, however, the torque output may exceed the predefined torque threshold as the truck unloader 100 is attempting to advance to the wall and perform the sweep operation. In other words, the front portion 142 of the truck unloader 100 is configured to continuously perform the sweeping operations based on the calculated distance until it encounters the wall of the truck trailer 108 with the calculated distance more than the pre-defined distance threshold.

As discussed previously, when the distance is less than the predefined threshold or the torque output is more than the predefined threshold, the control is relayed to the decision-making system 191 at block 510. The decision-making system 191 may decide whether to perform a picking operation or the sweeping operation at block 512.

In some examples, the decision-making system 191 may execute a machine learning algorithm or a segmentation algorithm or a combination of both to decide whether to perform the picking operation or the sweeping operation. In some examples, the machine learning algorithm may include a machine learning model trained using multiple images which indicate poses of the robotic arm 102 and the condition of the carton pile. The decision-making system 191 may provide the current images from the sensors 176a, 176b to the machine learning model which may compare the images with the trained dataset and output an instruction either to perform the picking operation or the sweeping operation or halt the operations of the truck unloader 100.

In some examples, the segmentation algorithm may segment the point cloud data into clusters using a bottom-top or top-bottom clustering approach to identify a height of the individual cartons (i.e., the Y coordinates of the data points of the point cloud), which is then summed to find the height of the carton pile from the floor. The decision-making system 191 may include a memory which stores the operations to be performed based on the height of the carton pile in the form of a look up table. For example, if the height of the carton pile is less than 6 feet, then perform a sweeping operation or if the height of the carton pile is more than 6 feet, then perform a picking operation. Accordingly, the height of the cluster (i.e., the cartons in the carton pile) may be compared with pre-defined heights stored in the memory to decide between performing the sweeping operation or the picking operation. In this regard, the decision-making system 191 may decide whether to perform the picking operation or the sweeping operation or halt the operation of the truck unloader in response to a non-feasible condition to perform the sweeping operation. In this regard, a feasibility check for the continuous sweeping operation of the truck unloader 100 is performed in real time or near real time using the torque value and distance value such that the cartons are unloaded effectively without any damages.

Figure 6:
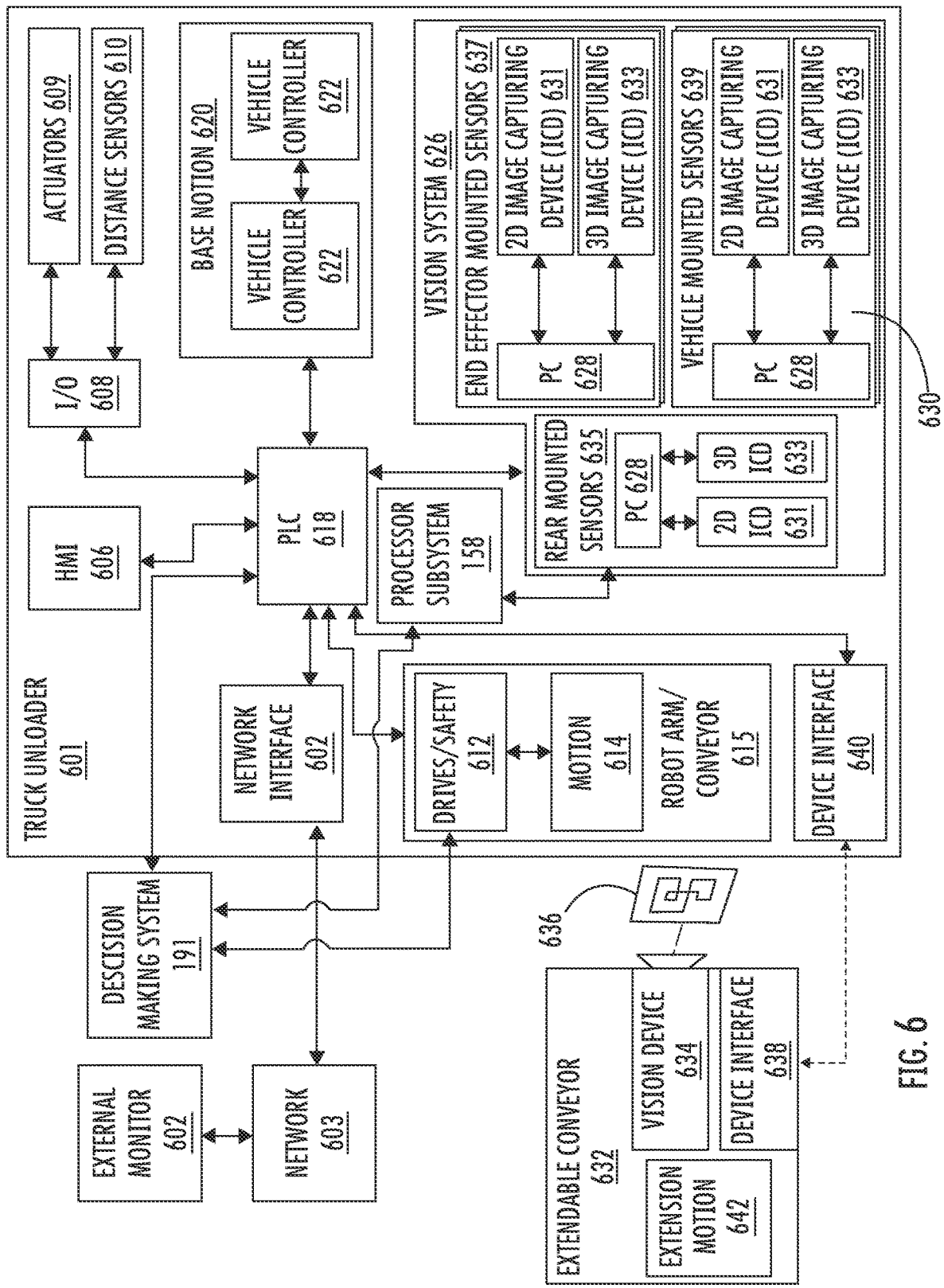
FIG. 6 illustrates an exemplary computing environment for a controller of the truck unloader system of FIG. 1, in accordance with an embodiment of the present subject matter.

FIG. 6 illustrates exemplary components of a material handling system 600 that includes truck unloader 601 suitable for use in various embodiments. The truck unloader 601 may include an external monitor 602, a network interface module 604, an HMI module 606, an input/output module (I/O module 608), a robotic arm and a conveyor system 615 that includes a drives/safety module 612 and a motion module 614, a programmable logic controller (or PLC 618), a base motion module 620 that includes a vehicle controller module 622 and a manual control module 624, and a vision system 626 (or visualization system) that may include one or more personal computing devices 628 (or "PCs") and sensor devices 630. In some embodiments, vision system 626 of the truck unloader 601 may include a PC 628 connected to each sensor device 630. In embodiments in which more than one sensor device 630 is present on the truck unloader 601, the PCs 628 for each sensor device 630 may be networked together and one of the PCs 628 may operate as a master PC 628 receiving data from the other connected PCs 628, may perform data processing on the received data and its own data (e.g., coordinate transformation, duplicate elimination, error checking, etc.), and may output the combined and processed data from all the PCs 628 to the PLC 618. In some embodiments, the network interface module 604 may not have a PLC inline between itself and the PC 628, and the PLC 618 may serve as the Vehicle Controller and/or Drives/Safety system. Sensor devices 630 can include 2D image capturing devices (ICDs) 631 and 3D image capturing devices (ICDs) 633 segregated into sectors for different viewing portions or vantage points. Subsets can include rear mounted sensors 635, end effector mounted sensors 637, and vehicle mounted sensors 639. The truck unloader 601 may further include a processor subsystem 158, which may part of the vehicle controller 622. In some examples, processor subsystem 158 may be in communication with the vision system 626 to receive one or more images and process the images in accordance with the example embodiments described in conjunction with FIG. 2.

The processor subsystem 158 may be a functional component of the controller 622 consisting of one or more central processing units (CPUs), digital signal processor/s (DSPs) and processor memory. Processor subsystem 158 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system.

In accordance with various aspects of the disclosure, an element, or any portion of an element, or any combination of elements may be implemented with the processor subsystem 158 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing subsystem 158 may execute instructions. A processing subsystem 158 that executes instructions to effect a result is a processing system which is configured to perform tasks causing the result, such as by providing instructions to one or more components of the processing subsystem 158 which would cause those components to perform acts which, either on their own or in combination with other acts performed by other components of the processing subsystem 158 would cause the result.

The truck unloader 601 may further include a decision-making system 191 communicable connected to the processor subsystem 158. In some examples, the decision-making system 191 may be installed or provisioned as a subsystem within the vehicle controller 622. The decision-making system 191 may decide whether to perform a picking operation or a sweeping operation and communicate the decision to the vehicle controller 622. The decision-making system 191 may be a computer system or a cloud computing system which includes one or more processors and memory/database to execute one or more algorithms, such as, but not limited to an image processing algorithm, machine learning algorithm, and the like. The functions performed by the decision-making system 191 is described in conjunction with FIG. 5. The truck unloader 601 may connect to remote locations or systems with the network interface module 604 (e.g., a Wi-Fi™ radio, etc.) via a network 603, such as a local area Wi-Fi™ network. In particular, the network interface module 604 may enable the truck unloader 601 to connect to an external monitor 602. The external monitor 602 may be anyone of a remote warehouse or distribution center control room, a handheld controller, or a computer, and may provide passive remote viewing through the vision system 626 of the truck unloader 601. Alternately, the external monitor 602 may override the programming inherent in the vision system 626 and assume active command and control of the truck unloader 601. Programming for the truck unloader 601 may also be communicated, operated and debugged through external systems, such as the external monitor 602. Examples of an external monitor 602 that assumes command and control may include a remotely located human operator or a remote system, such as a warehouse or distribution server system (i.e., remote device as described above). Exemplary embodiments of using an external monitor 602 to assume command and control of the truck unloader 601 may include human or computer intervention in moving the truck unloader 601, such as from one unloading bay to another, or having the external monitor 602 assume control of the robotic arm to remove an item (e.g., box, carton, etc.) that is difficult to unload with autonomous routines. The external monitor 602 may include any of: a visual monitor, a keyboard, a joystick, an I/O port, a CD reader, a computer, a server, a handheld programming device, or any other device that may be used to perform any part of the above-described embodiments.

The truck unloader 601 may include a human machine interface module 606 (or HMI module 606) that may be used to control and/or receive output information for the robot arm and conveyor system 615 and/or the base motion module 620. The HMI module 606 may be used to control (or may itself include) a joystick, a display, and a keypad that may be used for re-programming, over-riding the autonomous control of the machine, and driving the truck unloader 601 from point to point. Actuators 609 may be actuated individually or in any combination by the vision system 626 via the I/O module 608, and distance sensors 610 may be used to assist in guiding the truck unloader 601 into an unloaded area (e.g., a trailer). The I/O module 608 may connect the actuators 609 and distance sensors 610 to the PLC 618. The robotic arm and conveyor system 615 may include all components needed to move the arm and/or the conveyor, such as drives/engines and motion protocols or controls. The base motion module 620 may be the components for moving the entirety of the truck unloader 601. In other words, the base motion module 620 may be the components needed to steer the vehicle into and out of unloading areas.

The PLC 618 that may control the overall electromechanical movements of the truck unloader 601 or control exemplary functions, such as controlling the robotic arm or a conveyor system 615. For example, the PLC 618 may move the manipulator head of the robotic arm into position for obtaining items (e.g., boxes, cartons, etc.) from a wall of items. As another example, the PLC 618 may control the activation, speed, and direction of rotation of kick rollers, and/or various adjustments of a support mechanism configured to move a front-end shelf conveyor, such as front portion 142 of conveyor system 110 (FIG. 1). The PLC 618 and other electronic elements of the vision system 626 may mount in an electronics box (not shown) located under a conveyor, adjacent to a conveyor, or elsewhere on the truck unloader 601. The PLC 618 may operate all or part of the truck unloader 601 autonomously and may receive positional information from the distance sensors (not shown). The I/O module 608 may connect the actuators and the distance sensors 610 to the PLC 618.

The truck unloader 601 may include a vision system 626 that comprises sensor devices 630 (e.g., cameras, 3D sensors, etc.) and one or more computing device 628 (referred to as a personal computer or "PC" 628). The truck unloader 601 may use the sensor devices 630 and the one or more PC 628 of the vision system 626 to scan in front of the truck unloader 601 in real time or near real time. The forward scanning may be triggered by the PLC 618 in response to determining the truck unloader 601, such as a trigger sent in response to the truck unloader 601 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 626 may also provide depth perception, edge recognition, and may create a 3D image of a wall of items (or carton pile). The vision system 626 may operate alone or in concert with the PLC 618 to recognize edges, shapes, and the near/far distances of articles in front of the truck unloader 601. For example, the edges and distances of each separate carton in the wall of items may be measured and calculated relative to the truck unloader 601, and vision system 626 may operate alone or in concert with the PLC 618 to may select specific cartons for removal.

In some embodiments, the vision system 626 may provide the PLC with information such as: specific XYZ coordinate locations of cartons targeted for removal from the unloading area, and one or more movement paths for the robotic arm or the mobile body of the truck unloader 601 to travel. The PLC 618 and the vision system 626 may work independently or together such as an iterative move and visual check process for carton visualization, initial homing, and motion accuracy checks. The same process may be used during vehicle movement, or during carton removal as an accuracy check. Alternatively, the PLC 618 may use the move and visualize process as a check to see whether one or more cartons have fallen from the carton pile or repositioned since the last visual check. While various computing devices and/or processors in FIG. 6, such as the PLC 618, vehicle controller module 622, and PC 628, have been described separately, in the various embodiments discussed in relation to FIG. 6 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 632 can convey articles from the truck unloader 601 to other portions of a material handling system 600. As the truck unloader 601 advances or retreats, a vision device 634 on one or the extendable conveyor system 632 and truck unloader 601 can image a target 636 on the other. Vision system 626 can perform image processing to detect changes in size, orientation and location of the target 636 within the field of view of the vision device 636. Device interfaces 638, 640 respectively of the extendable conveyor system 632 and the truck unloader 601 can convey vision information or movement commands. For example, PLC 618 can command an extension motion actuator 642 on the extendable conveyor system 632 to correspond to movements of the truck unloader 601 to keep the extendable conveyor system 632 and the truck unloader 601 in alignment and in proper spacing. In one embodiment, the device interfaces 638, 640 utilize a short-range wireless communication protocol such as a Personal Access Network (PAN) protocol. Examples of PAN protocols which may be used in the various embodiments include Bluetooth®, IEEE 802.15.4, and Zigbee® wireless communication protocols and standards.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

Figure 7:
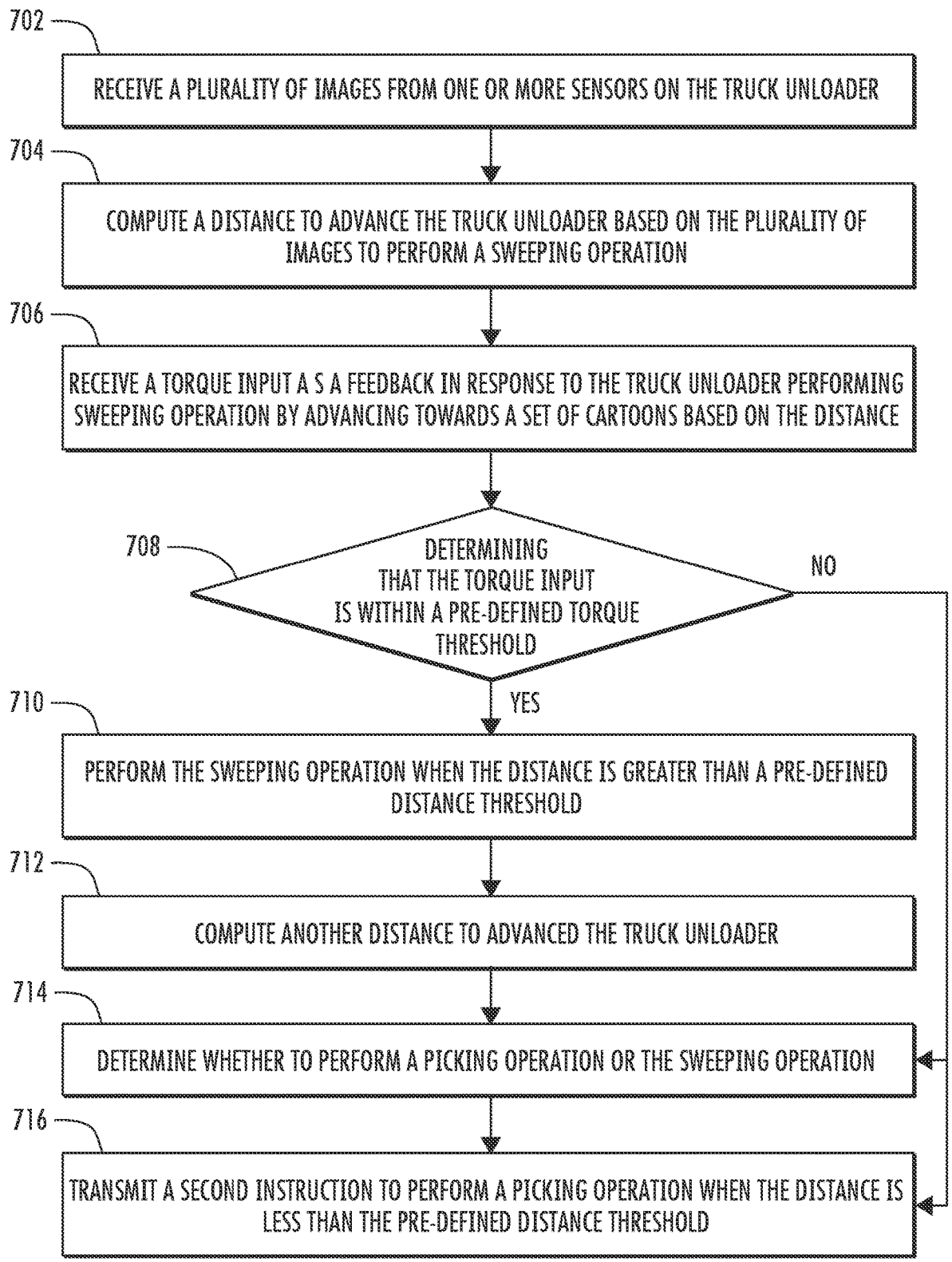
FIG. 7 illustrates an exemplary method for performing the sweeping operation by the truck unloader system of FIG. 1, in accordance with an embodiment of the present subject matter.

FIG. 7 illustrates an exemplary method for performing the sweeping operation by the truck unloader of FIG. 1, in accordance with an embodiment of the present subject matter. As discussed previously, the truck unloader may perform the continuous sweeping operation based on a vision feedback and torque feedback. The vision feedback and the torque feedback are processed by the detection system and the processor subsystem. The detection system 166 and the processor subsystem 158 to process the vision feedback as described in conjunction with FIG. 2. The detection system 166 and the processor subsystem 158 may be communicably coupled to the controller 144, 170 and one or more sensors of the truck unloader to perform the continuous sweeping operation.

Accordingly, at step 702, the detection system 144 receives a plurality of images from one or more sensors on the truck unloader. The one or more sensors may be 2D or 3D cameras being part of the vision system. The one or more sensors captures the images from multiple fields of view based on the pose of the robotic arm during the unloading operation. In some examples, the images may be indicative of the unloading environment which includes the carton pile, a portion of the tuck unloader, the carton pile container, and/or the like.

Further, at step 704, the processor subsystem 158, may compute a distance to advance the truck unloader based on the images to perform a sweeping operation. The distance is indicative of the distance the truck unloader has to advance to perform the sweeping operation. The distance is calculated by processing the images using the accumulating, filtering, and clustering techniques disclosed in conjunction with FIG. 2. The processor subsystem 158 communicates the distance to the controller to advance the truck unloader to the computed distance from its current position. The sweeping operation is performed by advancing the truck unloader to the computed distance. A feasibility check may be performed before the truck unloader advances to the computed distance using predefined distance threshold and predefined torque threshold as described in conjunction with FIG. 5.

When initiating the sweeping operation, at step 706, a torque input is received as a feedback from one or more force/torque sensors on the truck unloader. At step 708, the torque input is compared to the predefined torque threshold. In some examples, the comparison may be performed before computing the next distance to advance the truck unloader and while perform the sweeping operation based on the previously computed distance. When the torque input does not exceed the pre-defined torque threshold, then at step 710, the processor subsystem 158 transmits a first instruction to perform the sweeping operation. In such a scenario, at step 708, the feasibility check for the distance may also be verified by comparing the computed distance to the pre-defined distance threshold. At step 708, at least one but preferably two conditions are verified such as the distance threshold and the torque threshold.

Alternatively or additionally and in some examples, the processor subsystem 158 may refrain from communicating any instruction to the controller to perform the sweeping operation until the torque limit exceeds pre-defined torque threshold. In some examples, the processor subsystem 158 may refrain from communicating any instruction to the controller to perform the sweeping operation until the computed distance value falls below the predefined distance threshold.

After, the sweeping operation at 710 is performed by checking at least one but preferably the two conditions, the processor subsystem at step 712 begins computing another distance to advance the truck unloader for the next sweeping operation. In this regard, the distance is calculated recursively before each sweeping operation (i.e.,) before advancing the truck unloader forward towards the carton pile for the next sweeping cycle.

Referring back to step 708, when it is determined that the torque input exceed the predefined torque threshold, then at step 714, the processor subsystem determines whether to perform a picking operation or the sweeping operation. In some examples, the processor subsystem 158 may instruct the controller to stop performing the sweeping operation until a decision is made to perform either the picking operation or the sweeping operation. Such a decision may be based on the torque value, distance value or the image data processed currently or previously by the processor subsystem 158.

Referring back to step 708, when it is determined that the torque input exceed the predefined torque threshold and further when it is determined that the distance is less than the pre-defined distance threshold, then at step 716, the processor subsystem transmits a second instruction to perform the picking operation. In other words, if the two conditions based on the torque input and the computed distance fails, then the processor subsystem may decide to perform a picking operation rather than a sweeping operation. In some examples, the processor subsystem may communicate the values of the distance, torque and the image data to the decision-making system 191 to provide a decision to either sweep or pick. In this regard, the truck unloader may perform both the sweeping operation and the picking operation by continuously monitoring and comparing the distance values and the torque values.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable medium or non-transitory processor-readable medium. The steps of a method or algorithm disclosed herein can be embodied in a processor-executable software module (or processor-executable instructions) which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable medium and/or computer-readable medium, which can be incorporated into a computer program product.

While various embodiments in accordance with the principles disclosed herein have been shown and described above, modifications thereof can be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above can relate to specific embodiments but shall not limit the application of such issued claims to processes and structures accomplishing any or all of the above advantages or having any or all of the above features.

Also, techniques, systems, subsystems, and methods described and illustrated in the various embodiments as discrete or separate can be combined or integrated with other systems, modules, techniques, or methods without departing from the scope of the present disclosure. Other items shown or discussed as directly coupled or communicating with each other can be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. For example, the various elements or components can be combined or integrated in another system or certain features can be omitted or not implemented. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

As will be appreciated, any such computer program instructions and/or other type of code can be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry. In some embodiments, one or more external systems (such as a remote cloud computing and/or data storage system) can also be leveraged to provide at least some of the functionality discussed herein.

As described above and as will be appreciated based on this disclosure, embodiments of the present invention can be configured as methods, personal computers, servers, mobile devices, backend network devices, and the like. Accordingly, embodiments can comprise various means including entirely of hardware or any combination of software and hardware. Furthermore, embodiments can take the form of a computer program product on at least one non-transitory computer-readable storage medium having computer-readable program instructions (e.g., computer software) embodied in the storage medium. Any suitable computer-readable storage medium can be utilized including non-transitory hard disks, CD-ROMs, flash memory, optical storage devices, or magnetic storage devices.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

What is claimed is:

1. A truck unloader for unloading cartons from a carton pile, wherein the truck unloader comprises:
   a robotic arm;
   a front portion comprising a front-end roller, a conveyor and one or more torque sensors,
   wherein the front-end roller is provided on an end of the conveyor to contact one or more cartons,
   wherein the one or more torque sensors are positioned on the front-end roller and configured to measure a torque exerted on the front-end roller when contacting the one or more cartons during the unloading; and
   a controller comprising:
      a detection system configured to periodically receive one or more images from a vision system; and
      a processor subsystem in connection with the detection system configured to:
         calculate a distance from at least a portion of the truck unloader to the carton pile based on the one or more images;
         advance the truck unloader to perform a sweeping operation in an instance in which the calculated distance satisfies a predefined distance threshold;
         monitor the measured torque while performing the sweeping operation, wherein the sweeping operation is configured to continue until the torque exceeds a predefined torque threshold; and
         switch from the sweeping operation to a picking operation based at least on the measured torque exceeding the predefined torque threshold and when the distance is less than the predefined distance threshold.

2. The truck unloader of claim 1, wherein the front portion performs the sweeping operation by pulling the one or more cartons onto the conveyor.

3. The truck unloader of claim 1, wherein a value of the torque varies during each sweeping operation based on one of a carton dimension or packing arrangement of the carton pile or a wall of a carton pile container.

4. The truck unloader of claim 1, wherein the vision system comprises one or more sensors attached respectively to one of a mobile body or the robotic arm to provide a two-dimensional (2D) image and a three-dimensional (3D) point cloud data.

5. The truck unloader of claim 4, wherein the processor subsystem is further configured to perform transformations on the 3D point cloud data from a camera coordinate frame to a robot coordinate frame to calculate the distance.

6. The truck unloader of claim 5, wherein the processor subsystem is further configured to perform Euclidean clustering on the transformed 3D point cloud data to calculate the distance.

7. The truck unloader of claim 1, wherein the front portion is further configured to halt the sweeping operation when the torque exceeds the predefined torque threshold.

8. A controller for controlling a truck unloader for unloading cartons from a carton pile, wherein the truck unloader comprises: a robotic arm; a front portion comprising a front-end roller, a conveyor and one or more torque sensors, wherein the front-end roller is provided on an end of the conveyor to contact one or more cartons, wherein the one or more torque sensors are positioned on the front-end roller and configured to measure a torque exerted on the front-end roller when contacting the one or more cartons during the unloading, wherein the controller comprises:
a detection system configured to periodically receive one or more images from one or more sensors; and
a processor subsystem in connection with the detection system configured to:
calculate a distance from at least a portion of the truck unloader to the carton pile based on the one or more images;
advance the truck unloader to perform a sweeping operation based on the distance in an instance in which the distance satisfies a predefined distance threshold;
monitor the measured torque while performing the sweeping operation, wherein the sweeping operation is configured to continue until the torque exceeds a predefined torque threshold, and
switch from the sweeping operation to a picking operation based at least on the measured torque exceeding the predefined torque threshold and when the distance is less than the predefined distance threshold.

9. The controller of claim 8, wherein the processor subsystem further comprises: a segmentation module and a distance generation module configured to calculate the distance between the front portion of the truck unloader and a portion of the carton pile.

10. The controller of claim 8, wherein the processor subsystem further comprises: a point cloud accumulation module to accumulate 3D point cloud data of the one or more sensors.

11. The controller of claim 8, wherein the processor subsystem is further configured to estimate a pose of the robotic arm and a front portion of the truck unloader using forward kinematics.

12. A method for controlling a truck unloader to unload a set of cartons, wherein the truck unloader comprises: a robotic arm; a front portion comprising a front-end roller, a conveyor and one or more torque sensors, wherein the front-end roller is provided on an end of the conveyor to contact one or more cartons, wherein the one or more torque sensors are positioned on the front-end roller and configured to measure a torque exerted on the front-end roller when contacting the one or more cartons during unloading, the method for controlling comprising:
receiving, by a detection system, a plurality of images from one or more sensors on the truck unloader;
computing, by a processor subsystem, in connection with the detection system, a distance to advance the truck unloader based on the plurality of images to perform a sweeping operation;
receiving, by the processor subsystem, the torque as feedback in response to the truck unloader performing the sweeping operation by advancing towards the set of cartons based on the distance,
wherein in response to determining, by the processor subsystem, that the torque is within a pre-defined torque threshold,
transmitting, by the processor subsystem, a first instruction to perform the sweeping operation when the distance is greater than a pre-defined distance threshold; and
computing, by the processor subsystem, the distance to advance the truck unloader, wherein the distance is calculated recursively before each sweeping cycle,
wherein in response to determining, by the processor subsystem, that the torque exceeds the pre-defined torque threshold and the distance is less than the pre-defined distance threshold,
transmitting, by the processor subsystem, a second instruction to switch from the sweeping operation perform a picking operation.

13. The method of claim 12, wherein determining the torque is within the pre-defined torque threshold further comprises:
determining whether the distance exceeds the pre-defined distance threshold;
in response to determining that the torque is within the pre-defined torque threshold and the distance exceeding the pre-defined distance threshold, performing a second sweeping operation; and
in response to determining that the torque exceeds the pre-defined torque threshold or the distance is below the pre-defined distance threshold, determining whether to perform a third sweeping operation or a picking operation.

* * * * *